US009990443B2

(12) United States Patent
Song et al.

(10) Patent No.: US 9,990,443 B2
(45) Date of Patent: *Jun. 5, 2018

(54) MESSAGE PASSING IN A DISTRIBUTED GRAPH DATABASE

(71) Applicant: LinkedIn Corporation, Mountain View, CA (US)

(72) Inventors: Yongling Song, Dublin, CA (US); Andrew J. Carter, Mountain View, CA (US); Joshua D. Ehrlich, Mountain View, CA (US); Scott M. Meyer, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/264,267

(22) Filed: Sep. 13, 2016

(65) Prior Publication Data

US 2017/0124221 A1 May 4, 2017

Related U.S. Application Data

(63) Continuation of application No. 14/925,742, filed on Oct. 28, 2015, now Pat. No. 9,514,247.

(51) Int. Cl.
G06F 17/30 (2006.01)
G06F 7/00 (2006.01)

(52) U.S. Cl.
CPC .. *G06F 17/30979* (2013.01); *G06F 17/30958* (2013.01)

(58) Field of Classification Search
CPC ......... G06F 17/30463; G06F 17/30424; G06F 17/30554; G06F 17/30339; G06F 17/30;
(Continued)

(56) References Cited

U.S. PATENT DOCUMENTS 7,376,639 B2 5/2008 Kutsch
8,185,558 B1 5/2012 Narayanan
(Continued)

FOREIGN PATENT DOCUMENTS

EP 2937797 A1 10/2015
WO 2012091844 A1 7/2012

OTHER PUBLICATIONS

Lei Zou et al., "Summarization Graph Indexing: Beyond Frequent Structure-Based Approach", DASFAA 2008, LNCS 4947, pp. 141-155, XP-019087336, Mar. 2008.
(Continued)

*Primary Examiner* — Dung K Chau
(74) *Attorney, Agent, or Firm* — Park, Vaughan, Fleming & Dowler LLP

(57) ABSTRACT

A system executes a query associated with an application against a graph database by providing, to a first shard of the graph database, the query and a first query header that specifies the first shard. The query includes a subject, a predicate and an object, and the graph database stores a graph that includes nodes, edges between the nodes, and predicates to represent and store data. In response to the query, the system receives results and associated result headers from the first shard and a second shard, where the result headers specify that the results are partial results that are particular fractions of a total result. Furthermore, a combination of the partial results provides the total result to the query that includes a subset of the graph. Note that the subset of the graph may include desired information expressed within an associated structure of the graph.

20 Claims, 7 Drawing Sheets

(58) Field of Classification Search
CPC ......... G06F 17/30321; G06F 17/30961; G06F 17/30958
USPC .................. 707/774, 727, 769, 718, 999.003, 707/999.004; 706/54; 345/440
See application file for complete search history.

(56) References Cited

U.S. PATENT DOCUMENTS

| | | | |
|---|---|---|---|
| 8,533,182 B1* | 9/2013 | Charboneau | G06F 17/30979 707/718 |
| 8,736,612 B1* | 5/2014 | Goldman | G06Q 50/01 345/440 |
| 9,189,520 B2 | 11/2015 | May | |
| 9,292,570 B2 | 3/2016 | Sargeant | |
| 9,372,891 B2 | 6/2016 | Elias | |
| 9,378,303 B1* | 6/2016 | Shankar | G06F 17/30958 |
| 9,495,427 B2 | 11/2016 | Abadi | |
| 2003/0084043 A1 | 5/2003 | Acharya | |
| 2007/0192306 A1* | 8/2007 | Papakonstantinou | G06F 17/30864 |
| 2007/0239694 A1 | 10/2007 | Singh | |
| 2008/0116449 A1 | 5/2008 | Macready | |
| 2008/0306910 A1 | 12/2008 | Singh | |
| 2009/0132503 A1 | 5/2009 | Sun | |
| 2009/0240649 A1* | 9/2009 | Sereni | G06F 17/30395 706/54 |
| 2009/0240682 A1* | 9/2009 | Balmin | G06F 17/30395 |
| 2011/0270861 A1 | 11/2011 | Arshavsky | |
| 2012/0005224 A1* | 1/2012 | Ahrens | G06Q 10/10 707/769 |
| 2012/0047114 A1 | 2/2012 | Duan | |
| 2012/0096043 A1 | 4/2012 | Stevens, Jr. | |
| 2012/0136884 A1 | 5/2012 | Kanawa | |
| 2012/0179644 A1 | 7/2012 | Miranker | |
| 2012/0284255 A1 | 11/2012 | Schechter | |
| 2013/0091122 A1 | 4/2013 | Salch | |
| 2013/0097180 A1 | 4/2013 | Tseng | |
| 2014/0156632 A1 | 6/2014 | Yu | |
| 2014/0172914 A1 | 6/2014 | Elinkety et al. | |
| 2014/0201234 A1 | 7/2014 | Lee et al. | |
| 2014/0280044 A1 | 9/2014 | Huynh et al. | |
| 2014/0310302 A1* | 10/2014 | Wu | G06F 17/30442 707/769 |
| 2014/0330867 A1 | 11/2014 | Sarkar | |
| 2014/0337373 A1* | 11/2014 | Morsi | G06F 17/30424 707/769 |
| 2015/0012523 A1 | 1/2015 | Dey | |
| 2015/0026158 A1 | 1/2015 | Jin | |
| 2015/0052134 A1 | 2/2015 | Bornea | |
| 2015/0120717 A1* | 4/2015 | Kim | G06F 17/30699 707/727 |
| 2015/0120775 A1 | 4/2015 | Shao | |
| 2015/0127677 A1 | 5/2015 | Wang | |
| 2015/0134637 A1* | 5/2015 | Pall | G06F 17/30958 707/718 |
| 2015/0149435 A1 | 5/2015 | McKenna | |
| 2015/0169686 A1 | 6/2015 | Elias | |
| 2015/0234888 A1 | 8/2015 | Ahmed | |
| 2015/0302300 A1 | 10/2015 | Fletcher | |
| 2016/0071233 A1 | 3/2016 | Macko | |
| 2016/0171540 A1* | 6/2016 | Mangipudi | G06Q 30/0255 705/14.53 |
| 2016/0188594 A1 | 6/2016 | Ranganathan | |
| 2016/0246842 A1 | 8/2016 | Li | |
| 2016/0260011 A1 | 9/2016 | Corvinelli | |
| 2016/0314220 A1 | 10/2016 | Sachdev | |
| 2017/0010968 A1 | 1/2017 | Li | |

OTHER PUBLICATIONS

David W. Williams, "Graph Database Indexing Using Structured Graph Decomposition", 2007 IEEE, pp. 976-985, XP031095841, Apr. 2007.

Vijayan Prabhakaran, "Managing Large Graphs on Multi-Cores With Graph Awareness", USENIX, pp. 1-12, XP061013942, Apr. 11, 2013.

* cited by examiner

MESSAGE PASSING IN A DISTRIBUTED GRAPH DATABASE

CROSS-REFERENCE TO RELATED APPLICATION

This application is a continuation of U.S. patent application Ser. No. 14/925,742, which was filed Oct. 28, 2015. This application is related to: U.S. patent application Ser. No. 14/858,178, entitled "Graph-Based Queries", filed Sep. 18, 2015; U.S. patent application Ser. No. 14/858,192, entitled "Concatenated Queries Based on Graph-Query Results", filed Sep. 18, 2015; U.S. patent application Ser. No. 14/858,208, entitled "Verifying Graph-Based Queries", filed Sep. 18, 2015; U.S. patent application Ser. No. 14/858,213, entitled "Translating Queries into Graph Queries Using Primitives", filed Sep. 18, 2015; and U.S. patent application Ser. No. 14/858,225, entitled "Representing Compound Relationships in a Graph Database", filed Sep. 18, 2015, the contents of each of which are herein incorporated by reference.

BACKGROUND

Field

The described embodiments relate to techniques for performing a query of a database. More specifically, the described embodiments relate to techniques for communicating messages about queries and partial query results among shards in a graph database.

Related Art

Data associated with applications is often organized and stored in databases. Large databases are often subdivided into 'shards,' which contain subsets of the data. In principle, this architecture allows large databases to be implemented on multiple systems and/or may allow queries from the applications to be executed by the shards in parallel, which can reduce the time needed to obtain the query results.

In practice, such parallel execution of queries can be complicated. For example, information and decision-making about where data is stored in a distributed database may, in turn, need to be distributed. In particular, a client that is executing an application may need to have access to, or the ability to access, information about the structure of the distributed database, such as a global index that specifies which shards store desired information, so that the client can provide necessary queries to these shards. Alternatively or additionally, the shards may need to have access to, or the ability to access, the information about the structure of the distributed database, so that, when a shard receives a query for desired information that, at least in part, is stored in one or more other shards, the shard can forward the query to the appropriate shards.

Moreover, there may be considerable overhead associated with maintaining the information about the structure of the distributed database, as well as considerable overhead and complexity associated with the multiple messages exchanged with the client and among the shards in the distributed database. For example, whenever data is stored or updated in a particular shard, the information about the structure of the distributed database may need to be communicated using update messages within the distributed database and/or with clients. Similarly, if a query response from a shard only includes partial results, the partial results or information specifying the partial results may need to be included in messages when the initial query is forwarded within the distributed database. These messages may consume significant capacity and processing capability within the distributed database and/or within the clients. Consequently, the use of shards in a database may not provide all of the advantages it is supposed to and, in the worst case, can degrade performance and the user experience when using the associated application(s).

Figure 1:
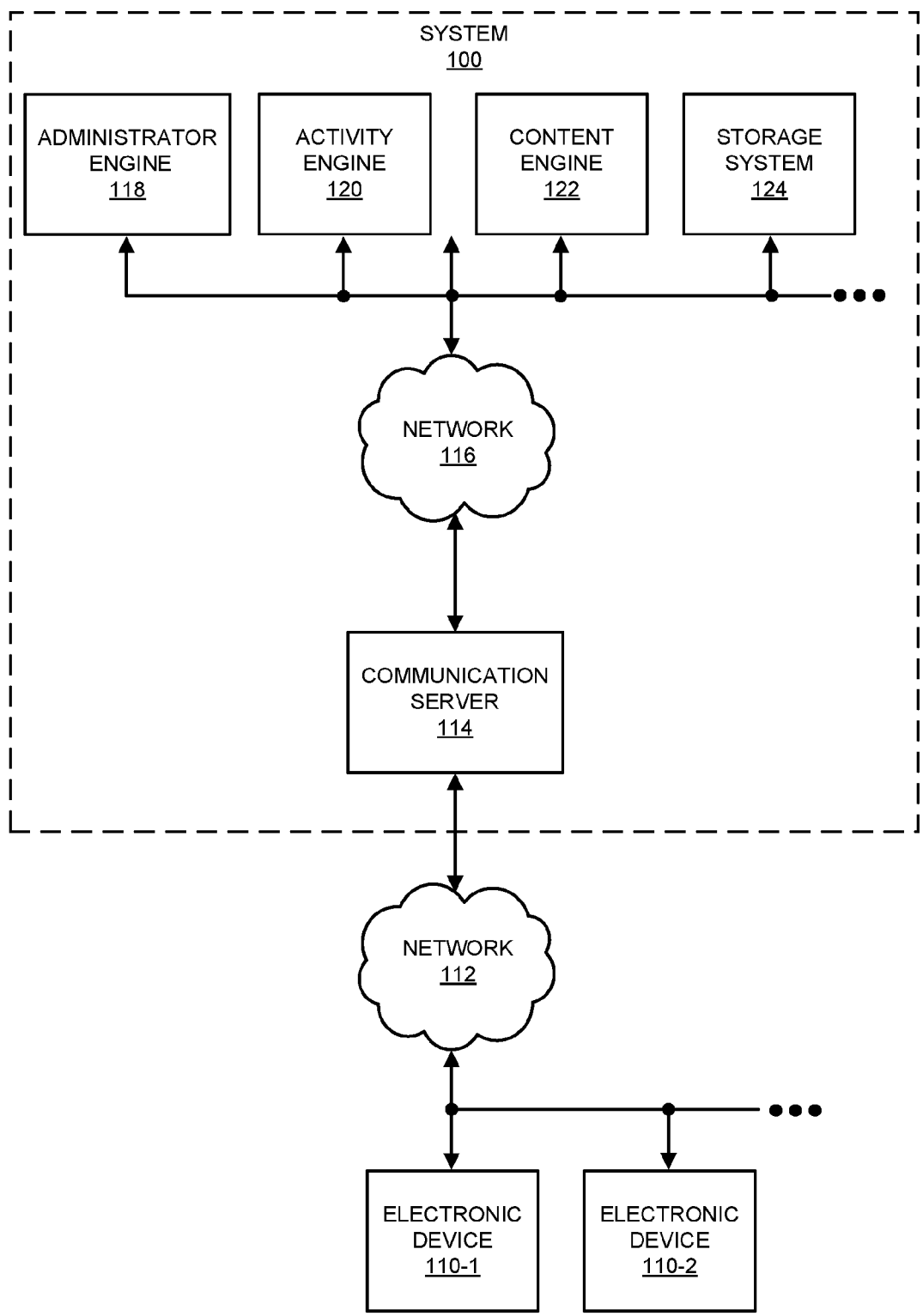
FIG. 1 is a block diagram illustrating a system in accordance with an embodiment of the present disclosure.

Table 1 provides an edge query in accordance with an embodiment of the present disclosure.

Table 2 provides data in JavaScript Object Notation (JSON) in accordance with an embodiment of the present disclosure.

Table 3 provides an edge query in accordance with an embodiment of the present disclosure.

Table 4 provides a result for an edge query in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

An illustrative graph database stores a graph that includes nodes, edges between the nodes, and predicates to represent and store data with index-free adjacency. In order to request desired information from the graph database, a system executes a query associated with an application against the graph database by providing the query and a first query header to a first shard of the graph database. The query includes a subject, a predicate and an object, and the first query header specifies the first shard. Furthermore, the query (which is sometimes referred to as an 'edge query') may identify a first edge associated with a predicate that specifies one or more of the nodes in the graph.

In response to the query, the system receives first results and a first result header from the first shard, where the first result header specifies that the first results are first partial results that are a fraction of a total result. Moreover, the system receives additional results and an additional result header from one or more additional shards of the graph database in response to the query, where each additional result header specifies that the additional results are additional partial results that are additional fractions of the total result of the query. Furthermore, a combination of the first partial results and the additional partial results provides the total result to the query that includes a subset of the graph. Note that the subset of the graph may include the desired information expressed within an associated structure of the graph.

In this way, this graph-storage technique may allow information associated with query to be efficiently extracted from the graph database. In particular, instead of the system performing multiple queries with each of multiple shards in the graph database, and/or maintaining distributed information about the structure of the graph database in the shards (such as a global index that specifies the location in the graph database where particular data is stored), the graph-storage technique may allow fewer and simpler messages to be communicated in the graph database, and may not require the use of distributed information about the structure of the graph database in the shards. For example, when the first results are the first partial results (which may be determined based on the associated structure of the graph), the first shard that receives the query may forward the query to the second shard without requiring that the first shard forward the first results to the second shard.

Consequently, the graph-storage technique may reduce the computation time and the communication and memory requirements needed for a computer system to extract the desired information from the graph database for an application relative to other types of databases, such as a relational database or a key-value store. Moreover, the graph-storage technique may improve the performance of applications that use the graph database without changing the manner in which the applications access data in the graph database (i.e., by viewing data as a hierarchy of objects in memory with associated pointers). Furthermore, the improved performance of the applications may also improve the user experience when using the applications.

In the discussion that follows, an individual or a user may be a person (for example, an existing user of a social network or a new user of a social network). Also, or instead, the graph-storage technique may be used by any type of organization, such as a business, which should be understood to include for-profit corporations, non-profit corporations, groups (or cohorts) of individuals, sole proprietorships, government agencies, partnerships, etc.

We now describe embodiments of the system and its use. FIG. 1 presents a block diagram illustrating a system 100 that performs a graph-storage technique. In this system, users of electronic devices 110 may use a service that is provided, at least in part, using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as a professional social network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network. For example, administrator engine 118 may handle user accounts and user profiles, activity engine 120 may track and aggregate user behavior over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices, i.e., a large-scale storage system.

Note that each of the users of the social network may have an associated user profile that includes personal and/or professional characteristics and experiences, which are sometimes collectively referred to as 'attributes' or 'characteristics.' For example, a user profile may include: demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include: log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections. However, as described further below, the nodes in the graph stored in the graph database may correspond to additional or different information than the members of the social network (such as users, companies, etc.). For example, the nodes may correspond to attributes, properties or characteristics of the users.

Note that it may be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner. For example, when an application requests data associated with a complicated relationship (which may involve two or more edges, and which is sometimes referred to as a 'compound relationship'), a set of queries may be performed and the results may then be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results may, therefore, be time-consuming. This degraded performance may, in turn, degrade the user experience when using the application and/or the social network.

In order to address these problems, storage system 124 may include a graph database that stores a graph (e.g., as part of an information-storage-and-retrieval system or engine). Note that the graph may allow an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
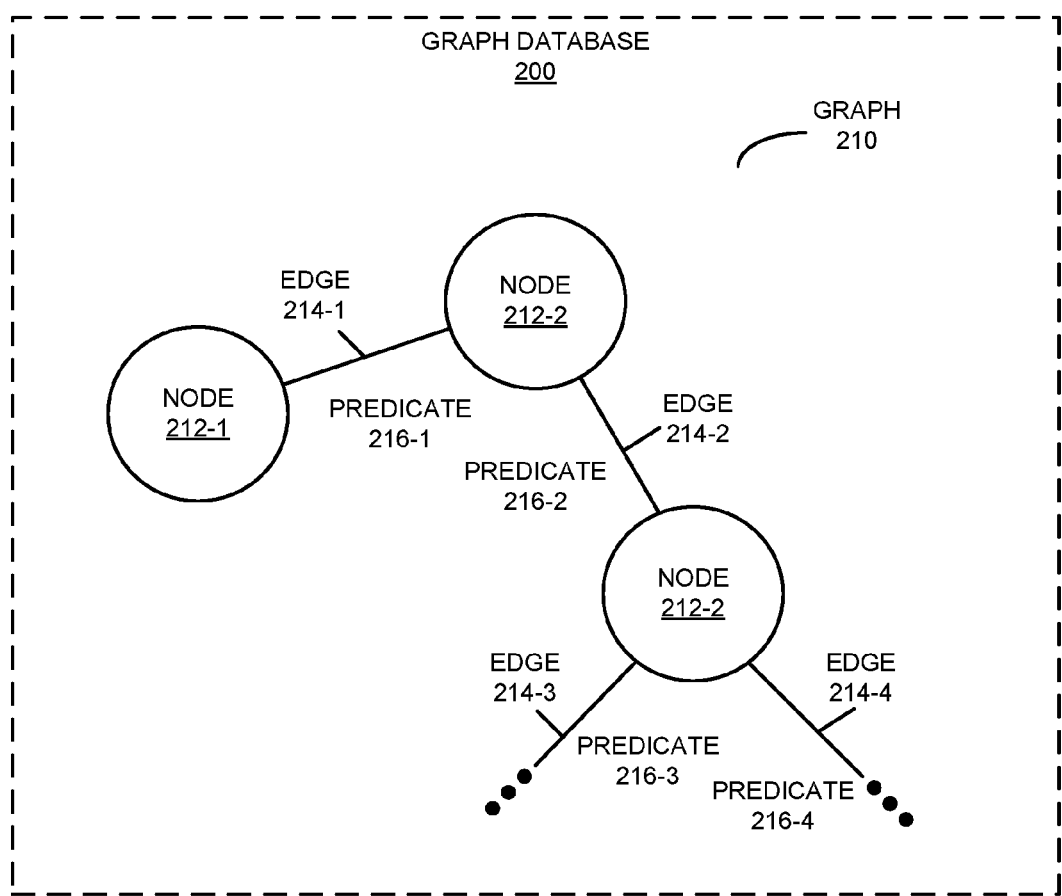
FIG. 2 is a block diagram illustrating a graph in a graph database in the system of FIG. 1 in accordance with an embodiment of the present disclosure.

FIG. 2 presents a block diagram illustrating a graph 210 stored in a graph database 200 in system 100 (FIG. 1). Graph 210 may include nodes 212, edges 214 between nodes 212, and predicates 216 (which are primary keys that specify or label edges 214) to represent and store the data with index-free adjacency, i.e., so that each node 212 in graph 210 includes a direct edge to its adjacent nodes without using an index lookup.

Note that graph database 200 may be an implementation of a relational model with constant-time navigation, i.e., independent of the size N, as opposed to varying as log(N). Moreover, all the relationships in graph database 200 may be first class (i.e., equal). In contrast, in a relational database, rows in a table may be first class, but a relationship that involves joining tables may be second class. Furthermore, a schema change in graph database 200 (such as the equivalent to adding or deleting a column in a relational database) may be performed with constant time (in a relational database, changing the schema can be problematic because it is often embedded in associated applications). Additionally, for graph database 200, the result of a query may be a subset of graph 210 that preserves intact the structure (i.e., nodes, edges) of the subset of graph 210.

The graph-storage technique may include embodiments of methods that allow the data associated with the applications and/or the social network to be efficiently stored and retrieved from graph database 200. For example, as described below with reference to FIGS. 4 and 5, the graph-storage technique may provide a subset of graph 210 in response to a query that is either received by system 100 (FIG. 1) and/or is generated by system 100 (FIG. 1). Moreover, the results of a query may be used in concatenated or sequential queries. In particular, instead of independently applying a first query and a second query to graph database 200, the second query may be applied to the results of the first query (which include a subset of graph 210). In this way, complicated relationships can be obtained directly without subsequent joining or linking of intermediate results, thereby reducing the time needed to obtain desired information and the system resources used to obtain the desired information.

In some embodiments, a query that is associated with another type of database or that is in a different language than that associated with graph database 200 (such as JavaScript Object Notation or JSON) may be translated into the edge-based format that is used with graph database 200 prior to executing the query against graph database 200.

As noted previously, graph database 200 may be subdivided into shards on multiple computers. This architecture may allow queries from the associated application(s) to be executed by the shards in parallel, which, in principle, can reduce the time needed to obtain the query results. However, in practice, the use of shards may require significant overhead (such as maintaining one or more local copies of a global index for use by the applications and/or the shards, and the communication of multiple messages with partial results for the queries) and complexity, which can degrade the performance of graph database 200 and the user experience when using the applications.

Figure 3:
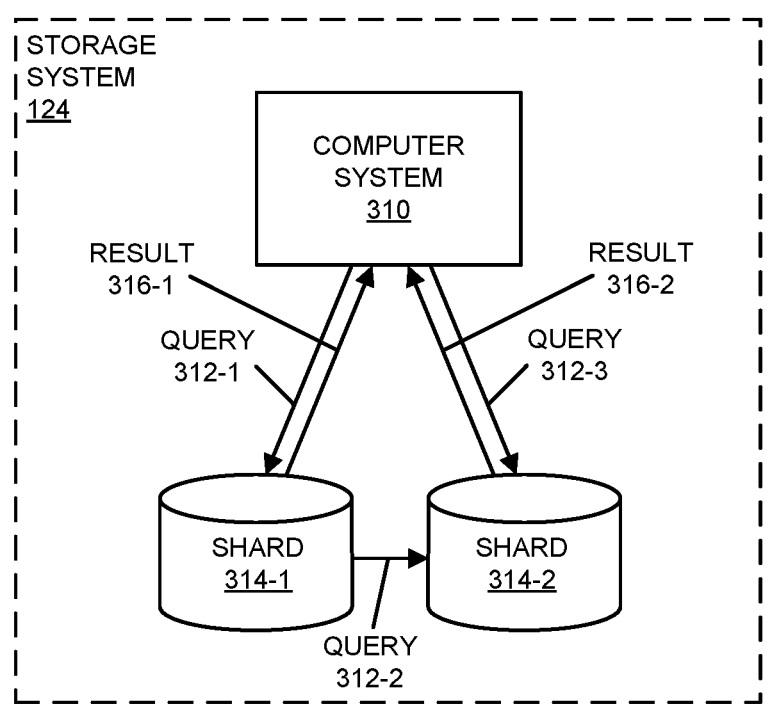
FIG. 3 is a block diagram illustrating communication within the graph database in the system of FIG. 1 in accordance with an embodiment of the present disclosure.

These problems may be addressed using a communication protocol for distributed query processing in the graph-storage technique. In particular, as shown in FIG. 3, which presents a block diagram illustrating communication within graph database 200 (FIG. 2), a computer system 310 (such as a server) in storage system 124 executes a query associated with an application (such as a query received from the application and/or generated by storage system 124) by providing a query message 312-1 including the query and a first query header to a shard 314-1 (e.g., another computer system, a component of a distributed storage system, etc.) of graph database 200 (FIG. 2). Note that the first query header may specify shard 314-1.

In response to the query, computer system 310 may receive a result message 316-1 with first results and a first result header from shard 314-1, where the first result header specifies that the first results are first partial results that are a fraction of a total result. Moreover, computer system 310 may receive result message 316-2 with second results and a second result header from shard 314-2, where the second result header specifies that the second results are second partial results that are a second fraction of a total result. Note that a combination of the first partial results and the second partial results (and possible additional results) may provide the total result to the query. The total result may include a subset of the graph, which includes desired information expressed within an associated structure of the graph in graph database 200 (FIG. 2). Thus, computer system 310 may combine the first partial results and the second partial results (and additional results, as necessary) to obtain the total result.

Furthermore, computer system 310 may receive result message 316-2 without directly communicating a query message to shard 314-2. Instead, shard 314-1 may provide, to shard 314-2, query message 312-2 with the query and a second query header (which specifies shard 314-2). Alternatively, computer system 310 may receive result message 316-2 after directly communicating query message 312-3 to shard 314-2. Thus, the communication protocol in the graph-storage technique may involve direct (1:1) communication between a given shard and computer system 310 (such as when the location of the desired information in shards 314 is known), direct (N:1) communication between shards 314 and computer system 310 and/or indirect communication between one or more of shards 314 and computer system 310 mediated by one or more intervening shards (i.e., when messages are forwarded from one shard to another).

In some embodiments, computer system 310 may maintain a request map that keeps track of outstanding queries and where they were sent (such as to which of shards 314), so that, if computer system 310 determines that a portion of the total result is missing or a predefined time interval (such as a timeout) has elapsed, computer system 310 can resend the query to the appropriate shard or shards. For example, the predefined time interval may be 1, 5, or 10 s.

(In the preceding discussion, partial results are returned to computer system 310. However, note that in some embodiments a given shard has the option to return partial results or to not return partial results to computer system 310.)

Referring back to FIG. 1, the graph-storage techniques described herein may allow system 100 to efficiently and quickly (e.g., optimally) store and retrieve data associated with the applications and the social network without requiring the applications to have knowledge of a relational model implemented in graph database 200. Consequently, the graph-storage techniques may improve the availability and the performance or functioning of the applications, the social network and system 100, which may reduce user frustration and which may improve the user experience. Therefore, the graph-storage techniques may increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 4:
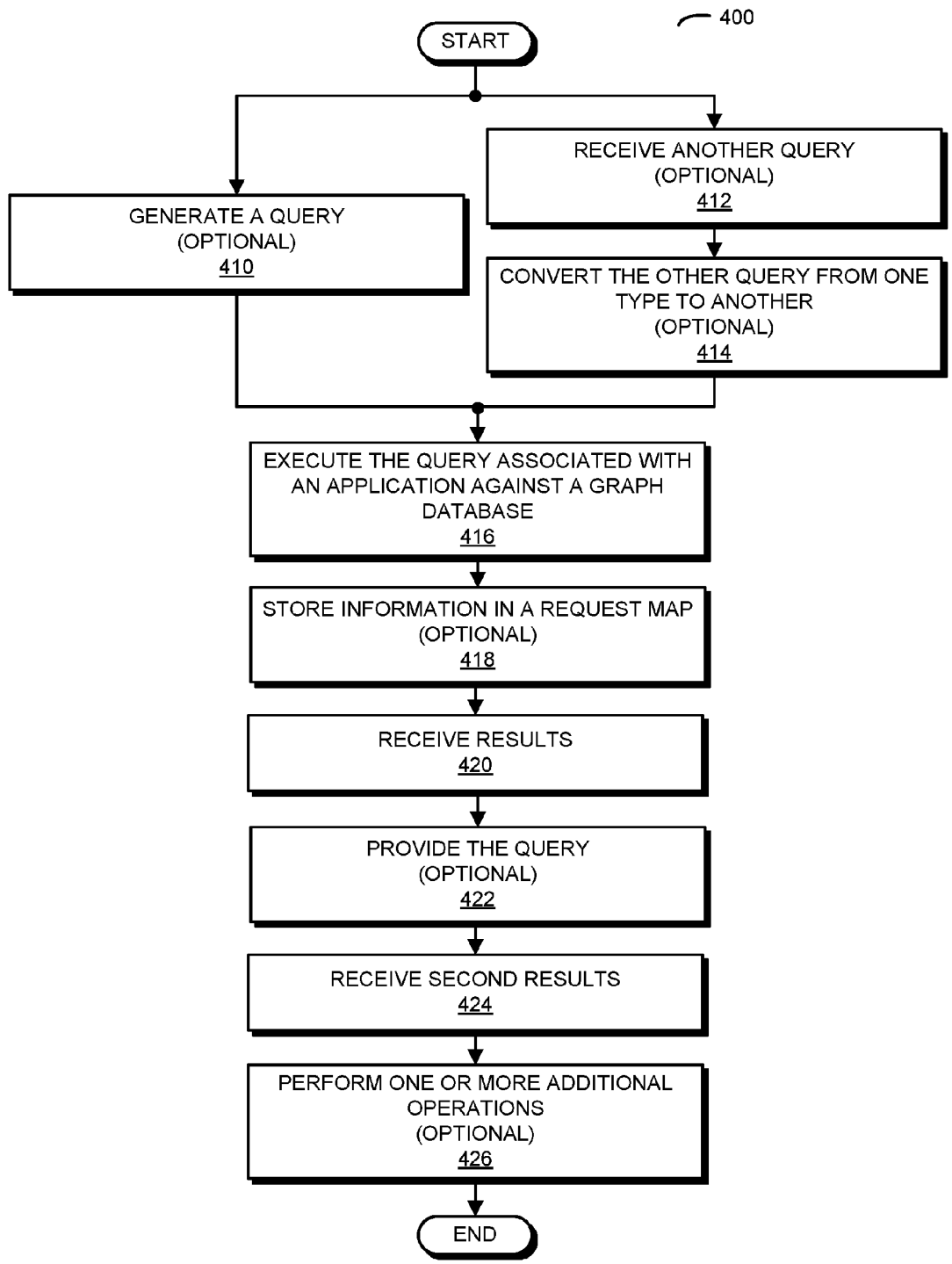
FIG. 4 is a flow chart illustrating a method for requesting desired information from a graph database in the system of FIG. 1 in accordance with an embodiment of the present disclosure.

We now describe embodiments of the graph-storage technique. FIG. 4 presents a flow chart illustrating a method 400 for requesting desired information from a graph database, which may be performed by a computer system (such as system 100 in FIG. 1 or computer system 700 in FIG. 7). During operation, the computer system may optionally generate a query (operation 410) with a subject, a predicate and an object based on desired information (which may have been received from an application). For example, the query may be associated with entities in a professional network.

Alternatively, the computer system may optionally receive another query (operation 412), e.g., from the application, and the computer system may optionally convert the other query from one type to another (operation 414). For example, the other query may be compatible with a type of database that is different from the graph database (such as a relational database and/or a hierarchical database, e.g., the type of database may use SQL). In some embodiments, the other query is compatible with JSON, and may be converted into a query compatible with Datalog. More generally, the query obtained via operation 410 or operation 414 may be compatible with a query language that is declarative so that it expresses computational logic without expressing an associated control flow (i.e., it may indicate to the computer system a desired outcome without specifying how it should be achieved, so that it can be optimized), and may be complete so that an arbitrary computation is represented or expressed by the query language (e.g., the query language may have features such as transformation, composition, and query by example).

Moreover, the computer system executes the query (which is associated with an application) against the graph database (operation 416) by providing the query and a first query header to a first shard of the graph database. Note that a graph stored in the graph database may include nodes, edges between the nodes, and predicates to represent and store data with index-free adjacency, and the first query header may specify the first shard. In some embodiments, the computer system optionally stores information in a request map (operation 418) that indicates the query was sent to the first shard.

Then, the computer system receives first results (operation 420) and a first result header from the first shard in response to the query, wherein the first result header specifies that the first results are first partial results that are a fraction of a total result. Moreover, the computer system receives second results (operation 424) and a second result header from a second shard of the graph database in response to the query, where the second result header specifies that the second results are second partial results that are a second fraction of the total result. The second results may be received without the computer system providing the query to the second shard, e.g., the first shard may provide the query to the second shard. Alternatively, the computer system may optionally provide the query (operation 422) and a second query header to the second shard, where the second query header specifies the second shard.

In some embodiments, the computer system performs one or more optional additional operations (operation 426).

For example, a combination of the first partial results and the second partial results may provide the total result to the query that includes a subset of the graph, wherein the desired information may be expressed in the total result within an associated structure of the graph, and/or the total result may exclude hierarchical constraints and relational constraints. Therefore, in some embodiments, the computer system optionally combines the first partial results and the second partial results to obtain the total result. Alternatively or additionally, the computer system may optionally provide at least a portion of the total result to the application.

Moreover, the first partial results and/or the second partial results may be received (operations 420 and 424) in a set of packets with associated sub-result headers that specify a total number of packets and a position of a given packet in the set of packets, which may allow the computer system to determine whether the total result has been received. If the total result has not been received or a predefined time interval (such as a timeout) has elapsed since the query was provided (operation 416), the computer system may optionally resend the query to the first shard based on the request map.

Figure 5:
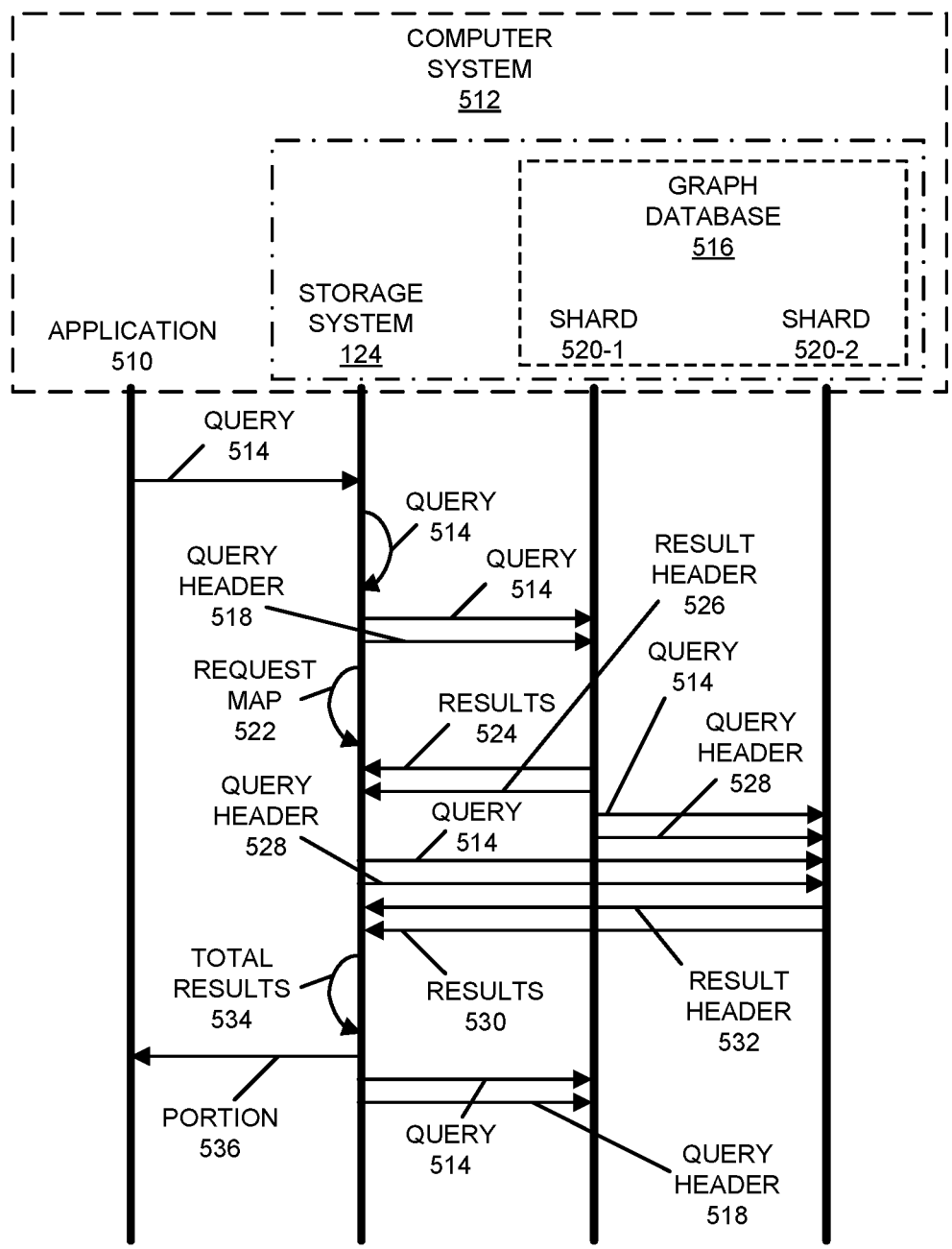
FIG. 5 is a drawing illustrating interaction with a graph database in the system of FIG. 1 in accordance with an embodiment of the present disclosure.

In an exemplary embodiment, method 400 is implemented using one or more applications and a storage system (or engine), in the computer system, that interact with each other. This is illustrated in FIG. 5. During this method, an application 510 executing in computer system 512 (which may implement some or all of the functionality of system 100 in FIG. 1) may provide a query 514 to storage system 124. Alternatively, storage system 124 may generate query 514 (e.g., based on desired information requested by application 510) or may translate an initial query received from application 510 (which may be in a different language that is not compatible with graph database 516) into query 514 (which is an edge query that is compatible with graph database 516).

Then, storage system 124 may execute query 514 against graph database 516 storing a graph by providing query 514 and a query header 518 to a shard 520-1 of graph database 516. In some embodiments, storage system 124 optionally stores information in a request map 522 that indicates query 514 was sent to shard 520-1.

Next, storage system 124 may receive results 524 and a result header 526 from shard 520-1 in response to query 514, wherein result header 526 specifies that results 524 are first partial results that are a fraction of a total result. Moreover, storage system 124 may receive results 530 and a result header 532 from a shard 520-2 of graph database 516 in response to query 514, where result header 532 specifies that results 530 are second partial results that are a second fraction of the total result. In some embodiments, results 530 are received without storage system 124 providing query 514 to shard 520-2. For example, shard 520-1 may provide query 514 and query header 528 to shard 520-2, where query header 528 specifies shard 520-2. Alternatively, storage system 124 may optionally provide query 514 and a query header 528 to shard 520-2.

Furthermore, storage system 124 may optionally combine the first partial results and the second partial results (and possibly additional partial results) to obtain total result 534, which may include a subset of a graph stored in graph database 516. Note that desired information may be expressed in total result 534 within an associated structure of the graph. In some embodiments, storage system 124 optionally provides at least a portion 536 of total result 534 to application 510.

Additionally, if total result 534 is not received within predefined time interval (such as a timeout) after query 514 was provided to shard 520-1, storage system 124 may optionally resend query 514 and query header 518 to shard 520-1 based on request map 522.

In an exemplary embodiment, the graph database has a schema that represents edges using triples (subject, predicate, object) that specify first-class relations. The use of a triple as the fundamental relation in the data provides meaning that can be directly consumed by a human being. In some embodiments, a quad is used to capture/represent additional information, such as ownership or provenance. However, in other embodiments a variable length relation is used in the graph.

Note that each field in a triple may have an associated integer 'entity identifier.' This edge structure may allow joining to occur in the domain of integers, specifically sets of integers as marshalled by an inverted index. Moreover, this domain may allow succinct representation and a fast join implementation. Furthermore, the triples may be mapped into structure hierarchies, such as JSON or HyperText Markup Language (HTML) templates that are often used in the upper reaches of the stack. Thus, query results may be converted in JSON.

In the graph database, there may not be a separate notion of an 'attribute.' Instead, two different edge types may be represented by two different triples having a common intermediate node. For example, a member-to-member connection between members 1234 and 4567 in the social network may be represented as Edge(x, 'left_member', 'member/1234'), Edge(x, 'left_score', 6.7), Edge(x, 'right_member', 'member/4567'), Edge(x, 'right_score', 23.78) and Edge(x, 'creation_date', '2014-sep-26'), where 'x' indicates the intermediate node. Note that data formerly known as 'attributes' may exist as triples that are separately updatable, fully indexed, and queryable without additional complexity. As with other predicates, predicates used as attributes may be created on demand.

The physical storage for the graph and the indexes may be log structured and may be mapped directly to memory. Nodes and edges may be identified by their offset in the physical log. This log structure may create a natural virtual time that can be exploited for consistency, and that may allow unrestricted parallel access to physical data and indexes for join performance.

As noted previously, edges may be accessible by inverted indexes. For example, 'iSub(1234)' may yield a set of integer node identifiers and log offsets of the edge(s) whose subject is '1234.' Inverted indexes with pre-computed subject-predicate and object-predicate intersections may allow constant-time navigation, which consists of a hash-table lookup to get a set of edges followed by an array access to navigate across each edge.

Note that the inverted indexes may be 'normalized' in the sense that they may not include copies of any of the data that they index. Thus, the schema for an inverted index may include a mapping from a subject identifier to a set of edge identifiers (S→{I}), a mapping from a predicate identifier to a set of edge identifiers (P→{I}), a mapping from an object identifier to a set of edge identifiers (O→{I}), a mapping from a subject identifier and a predicate identifier to a set of edge identifiers (S,P→{I}), and a mapping from an object identifier and a predicate identifier to a set of edge identifiers (O,P→{I}). Moreover, the set of edge identifiers may in turn specify the triple (I[i]→{S:s, P:p, O:o}).

Furthermore, using a 3-level memory hierarchy, de-normalization (i.e., copying parts of the edge into the indexes) can result in faster execution and a smaller memory footprint (S→{P,O}, P→{S,O}, O→{P,S}, S,P→{O} and O,P→{S}). This approach may be equivalent to a posting list. Note that the index may not need to include the edges at all. In some embodiments, this approach may be extended further so that S→P→{O}, P→S→{O}, P→O→{S} and O→P→{S}. Thus, there may be two predicate indexes, one forward from S to O and another in reverse. In principle, all six permutations may be need, but in practice for most queries four may be sufficient.

In some embodiments of de-normalization, graphs are created for some or all entities in the social network (individual members, companies, etc.). In this example, a graph may include a complete neighborhood of first-order connections, with tens or even hundreds of thousands of edges. While this approach would duplicate a huge amount of data, there may not be a need for indexing. Instead, a single sequential scan of the edges may be stored in memory.

A graph may be larger than a single machine (or computer system) can store intact, so it may be split up into shards with a machine dedicated to each shard. In some embodiments, a hybrid sharding approach is used, in which a large index set is split across many machines to allow parallelism, while at the same time keeping small index sets together on a single machine so that query evaluation can make decisions based on a 'locally closed world.' For example, such a graph partitioning may have the entertainment industry in one shard, computer programmers in another, finance in another, and so forth. Thus, for an influential member of a professional social network, such as Richard Branson, millions of follower edges may be spread across multiple shards.

By specifying that each shard is a database in its own right, and making an initial top-level query evaluator work with a federation of databases, flexibility in the sharding implementation may be obtained. In particular, federated query evaluation may start by offering the complete query to all shards with the expectation that each shard will return everything it knows about the result or the answer. Thus, responses may range from the complete answer to a set of member-to-member links in the social network that may play a role in the result.

In some embodiments, the graph database (or databases) uses a static query plan. In these embodiments, an optimizer may inspect a query and, with the help of statistics from the data and indexes, produce a plan that is then executed. This static approach may work well when the overhead of starting or stopping execution is large (such as when data is streaming from a hard disk drive) and the data may be readily summarized using statistics.

However, because graph data stored in memory typically does not have these properties (it is usually never more than an L3 cache-miss from a processor, and skew is common), in some embodiments the graph database (or databases) uses dynamic query optimization. As shown in Table 1, a three-hop path 'a.b.c' may be embedded in a larger query q. Based on the indexes, the number of edges with predicates a, b, and c can be determined. Suppose that those are 400, 10 M, and 200 k edges, respectively. The evaluation may start with a. This may identify a set of candidates for x1 and x2, and these sets may be no larger than the number of edges, say 400 and 300, respectively. If there are 300 x2s, it may be reasonable to proceed with the b edges even though there are 10 M of those. For example, if b is 'place of birth,' there may be at most 300 candidates for x3. However, if b is something like 'follows,' then x2[0] may have 20 edges, x2[1] may have 243 edges, and x2[2] may have 5 M. With a static plan, there would be no choice other than grinding through all 5 M possibilities. Alternatively, a dynamic evaluator may defer processing the large fan-out as long as it remained more expensive than other alternatives, by either evaluating c or some other constraint in the ellipsis which might remove x2[2] from consideration.

TABLE 1 q(...) :-
...
Edge(x1, 'a', x2),
Edge(x2, 'b', x3),
Edge(x3, 'c', x4),
...

In an exemplary embodiment, an initial query from an application for data for a blog is in JSON. This is shown in Table 2, which shows a JSON query for blog posts sorted, descending, by date. As shown in Table 3, an initial query may be translated to or expressed as an edge query that is compatible with a graph database (such as an edge query expressed using Datalog or Prolog). In this edge query, keys from the initial query become predicates, such as 'text,' 'comments,' and 'author.' Moreover, the edge query may include a string (such as 'comment') and/or a variable (such as 'P' or 'C'). For example, the edge query may include syntax that specifies the date, order by date, a limit of three blog posts, etc. In Table 3, note that things to the left of ':—' are known as or are referred to as rules. In the edge-query format, multiple definitions of the same rule are disjunctions (ORs), and things separated by commas are conjunctions (ANDs).

TABLE 2

[{"node identifier" : "post 25"
 "text": "This is my blog ..."
 "comments": [{
   "author":{
     "name": "Joe"
     "image": "http// ..."
   ...
   }
   "text": "I agree"

TABLE 3 q(...) :-
  Edge(P, "comment", C)
  Edge(C, "author", _)
  Edge(C, "Text", _)
...

Table 4 shows results for an edge query, which include a group of edges in a subset of a graph, each of which is specified by a subject, a predicate and an object. Note that, in general, an edge query is a set of constraints that are to be applied to a database, and the output or result is a portion or a subset of a graph that meets the constraints (without hierarchical or relational constraints). Because the result includes the portion of the graph (with its associated structure), the result can be used without a schema or knowledge of the relational model implemented in the graph database. For example, the query can be applied to the result (i.e., the output of the query), and the same result may will be obtained. Such a conjunctive query is typically not possible with a SQL query for a relational database.

TABLE 4

Edge("post 25", "text", "This is my blog ...")
Edge("post 25", "comments", "C1")
Edge("C1", "author", "Joe")
...

Referring back to FIG. 3, there may be several types of communication among computer system 310 and shards 314 in graph database 200 (FIG. 2). In particular, there may be one-to-one communication between computer system 310 and one of shards 314, which answers a whole query and returns the result to an application (or a client). For example, one of shards 314 may find the connections for a user of a social network. Alternatively, there may be one-to-many communication between computer system 310 and two or more of shards 314, which each provide partial results back to computer system 310. (However, as note previously, in some embodiments a given shard has the option to return partial results or to not return partial results to computer system 310.) Moreover, there may be one-to-one indirect communication in which a query is sent to a first shard of shards 314, which returns part of the answer to computer system 310, and then forwards the query to a second shard of shards 314, which returns a remainder of the answer to computer system 310. Furthermore, there may be one-to-many indirect communication, in which a query is sent to an initial shard, which returns part of the answer to computer system 310, and then forwards the query to two or more additional shards, which return a remainder of the answer to computer system 310.

In some embodiments, instead of returning results 316-1 to computer system 310, shard 314-1 provides results 316-1 to shard 314-2. Then, shard 314-2 combines results 316-1 with results 316-2, and provides the combined result (which may be a partial result or a final result) to computer system 310.

Based on these types of communication, the communication protocol in the graph-storage technique may need to: identify the original query; be able to find an indirect return path when indirect communication occurs; and/or determine when a total result has been received.

In the communication protocol, an incoming message directed to a graph database, such as a query, may include a message header. The message header may include: a unique message identifier; a sub-message identifier that, when combined with the message identifier, can identify a unique part of a message (or a query) in one-to-many communication with particular shards; resources (such as a timestamp, processor, memory, etc.); a sequence identifier that specifies the order of a set of packets associated with a given message (which may be useful because the communication within the graph database may be asynchronous); a source node where the initial message came from; and a node uniform resource locator that tells a recipient where a message was sent from. Note that, by using the sequence identifier and an end-of-message character, a storage system may determine whether all of packets in the set of packets have been received (i.e., a stream has ended) or the order of the packets in the set of packets. For example, the sequence identifier of packets in the set of packets may start with '0' and may increase monotonically until a last packet, which may include the end-of-message character (or the end-of-message character may be true instead of false). Thus, the sequence identifier of a packet that includes the end-of-message character may be the maximum value of the sequence identifier.

Moreover, an outgoing message issued by a graph database or a portion (e.g., a shard) of a graph database, such as a result of a query, may include: a unique message identifier; a sub-message identifier that, when combined with the message identifier, can identify a unique part of a message (or a query) in one-to-many communication with particular shards; resources (such as a timestamp, processor, memory, etc.); a sequence identifier that specifies the order of a set of packets associated with a given messages; a source node where the initial message came from; an error-message string that specifies any errors that occurred; a node uniform resource locator that tells a recipient where a message was sent from; the end-of-message character that indicates whether this is the last packet or whether the data is complete (if not, additional packets will be received with the same message identifier and the same sub-message identifier); and status information (such as success, error, not available, cancel or continue, when a query is forwarded to another shard). Note that, by using the sequence identifier and the end-of-message character, a storage system may determine whether all of packets in the set of packets have been received or the order of the packets in the set of packets. For example, if the sequence identifier is five, when six packets are received the storage system knows that all the data has been received.

In an exemplary embodiment, the unique message identifier includes 128 bits, the sub-message identifier includes 32 bits, the sequence identifier includes 32 bits, and the end-of-message character includes one bit.

Furthermore, the message headers may include information that indicates that a query has been split or subdivided when a given shard obtained a partial result and forwarded the query to another shard (i.e., when there is fanout of a message). In particular, the message headers may include a weight (which is sometimes referred to as a 'refcnt'). The refcnt may include 64 bits and may start with a maximum value of one. Each time a query or a message is split, the refcnt may be split evenly among the children (divide by N). Thus, an initial message refcnt may become ½ and the ⅓.

When the storage system receives a response, it may start totaling up the weight or the refcnts, such that when a total weight or refcnt of one is received or determined the storage system knows it is done. For example, if a refcnt of 0.5 is received, the storage system knows to wait for the remaining 0.5 in one or more other messages.

Note that if a portion of the total result is missing, the total refcnt is less than a maximum value, or a timeout since a query was provided has been exceeded, the storage system may resend a query. For example, if a sequence identifier of a portion of a set of packets is missing, the storage system may know where it was supposed to come from, i.e., a particular shard, and the storage system may resend a query to that shard.

This communication protocol may provide a way to manage queries and subqueries, as well as to handle message fanout within a graph database. In particular, the communication protocol may allow the shards to 'fire and forget' when processing queries in a graph database. Instead, as noted previously, a computer system in the storage system may optionally keep track of outstanding queries and where they were sent using a request map.

Figure 6:
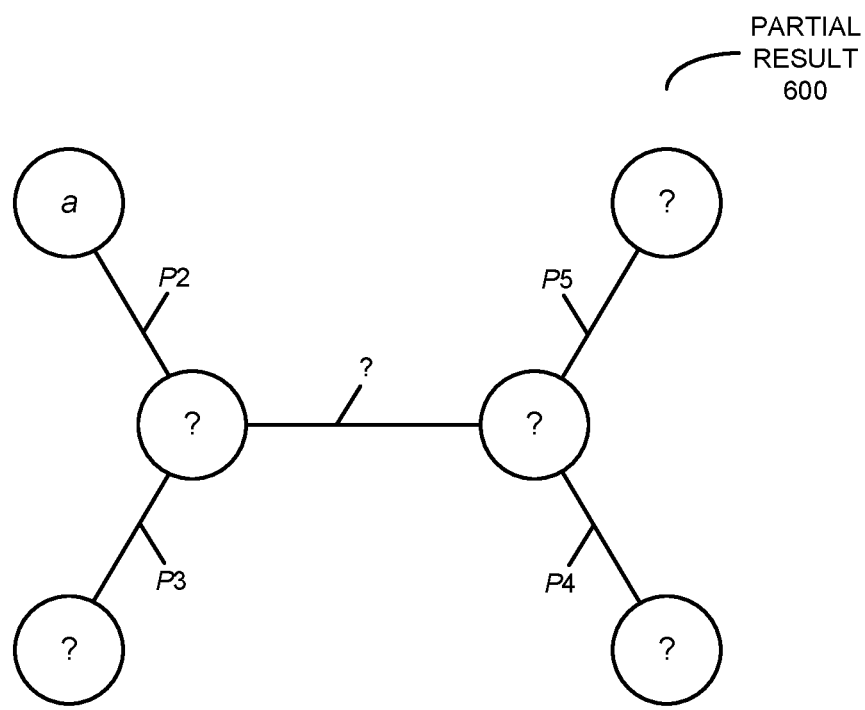
FIG. 6 is a drawing illustrating a partial result to a query in the system of FIG. 1 in accordance with an embodiment of the present disclosure.

FIG. 6 presents a drawing illustrating a partial result 600 to a query in system 100 (FIG. 1) that can occur during distributed processing of the query. In particular, one or more nodes or edges in a subset of a graph may still need to be determined by one or more shards in a graph database. As additional partial results are received, the storage system may processes the partial results based their intersection with the partial results that were previously received in order to obtain the subgraph with its associated structure (including the one or more nodes or edges in the subset of a graph that were missing).

Figure 7:
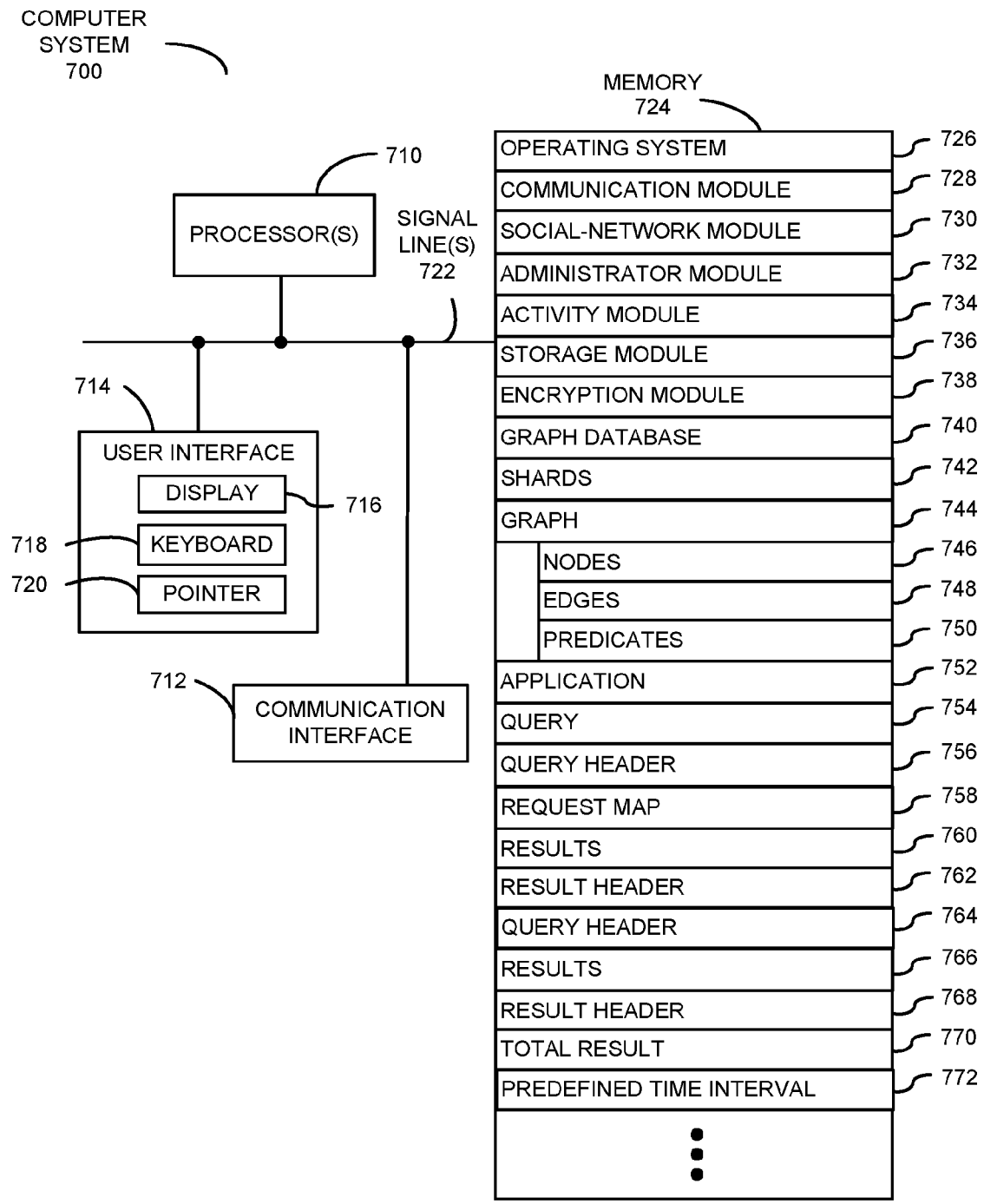
FIG. 7 is a block diagram illustrating a computer system that performs the method of FIG. 4 in accordance with an embodiment of the present disclosure.

We now describe embodiments of a computer system for performing the graph-storage technique and its use. FIG. 7 presents a block diagram illustrating a computer system 700 that performs method 400 (FIGS. 4 and 5), such as system 100 in FIG. 1. Computer system 700 includes one or more processing units or processors 710 (which are sometimes referred to as 'processing modules'), a communication interface 712, a user interface 714, memory 724, and one or more signal lines 722 coupling these components together. Note that the one or more processors 710 may support parallel processing and/or multi-threaded operation, the communication interface 712 may have a persistent communication connection, and the one or more signal lines 722 may constitute a communication bus. Moreover, the user interface 714 may include: a display 716 (such as a touchscreen), a keyboard 718, and/or a pointer 720 (such as a mouse).

Memory 724 in computer system 700 may include volatile memory and/or non-volatile memory. More specifically, memory 724 may include: ROM, RAM, EPROM, EEPROM, flash memory, one or more smart cards, one or more magnetic disc storage devices, and/or one or more optical storage devices. Memory 724 may store an operating system 726 that includes procedures (or a set of instructions) for handling various basic system services for performing hardware-dependent tasks. Memory 724 may also store procedures (or a set of instructions) in a communication module 728. These communication procedures may be used for communicating with one or more computers and/or servers, including computers and/or servers that are remotely located with respect to computer system 700.

Memory 724 may also include multiple program modules, including: social-network module 730, administrator module 732, activity module 734, storage module 736, and/or encryption module 738. Note that one or more of these program modules (or sets of instructions) may constitute a computer-program mechanism, i.e., software.

During operation of computer system 700, users of a social network facilitated by social-network module 730 may set up and manage accounts using administrator module 732. Moreover, social-network module 730 may facilitate interactions among the users via communication module 728 and communication interface 712. These interactions may be tracked by activity module 734, such as viewing behavior of the users when viewing documents (and, more generally, content) provided in the social network that is implemented using social-network module 730.

Storage module 736 may store data associated with the social network in a graph database 740 that stores a graph 744 with nodes 746, edges 748 and predicates 750. When storage module 736 receives a query 754 from an application 752, storage module 736 may execute query 754 against graph database 740. In particular, storage module 736 may provide query 754 and query header 756 to at least one of shards 742 (which is specified or identified by query header 756). In some embodiments, storage module 736 optionally stores information in a request map 758 that indicates query 754 was sent to at least the one of shards 742.

Next, storage module 736 may receive results 760 and a result header 762 from at least the one of shard 742 in response to query 754, where result header 762 specifies that results 760 are first partial results that are a fraction of a total result 770. Moreover, storage module 736 may receive results 766 and a result header 768 from at least one other of shards 742 of graph database 740 in response to query 754, where result header 768 specifies that results 766 are second partial results that are a second fraction of total result 770. In some embodiments, results 766 are received without storage module 736 providing query 754 to at least the other of shards 742, e.g., it may be indirectly communicated by one of shards 742 that directly received query 754 from storage module 736. Alternatively, storage module 736 may optionally provide query 754 and a query header 764 to at least the other of shards 742 (which is specified or identified by query header 764).

Furthermore, storage module 736 may optionally combine the first partial results and the second partial results to obtain total result 770, which may include a subset of graph 744 stored in graph database 740. Note that desired information may be expressed in total result 770 within an associated structure of graph 744. In some embodiments, storage module 736 optionally provides at least a portion of total result 770 to application 752.

Additionally, if total result 770 is not received within predefined time interval 772 (such as a timeout) after query 754 was provided to at least the one of shards 742, storage module 736 may optionally resend query 754 and query header 756 to at least the one of shards 742 based on request map 758.

Because information in computer system 700 may be sensitive in nature, in some embodiments at least some of the data stored in memory 724 and/or at least some of the data communicated using communication module 728 is encrypted using encryption module 738.

Instructions in the various modules in memory 724 may be implemented in a high-level procedural language, an object-oriented programming language, and/or in an assembly or machine language. Note that the programming language may be compiled or interpreted, e.g., configurable or configured, to be executed by the one or more processors.

Although computer system 700 is illustrated as having a number of discrete items, FIG. 7 is intended to be a functional description of the various features that may be present in computer system 700 rather than a structural schematic of the embodiments described herein. In practice, and as recognized by those of ordinary skill in the art, the functions of computer system 700 may be distributed over a large number of servers or computers, with various groups of the servers or computers performing particular subsets of the functions. In some embodiments, some or all of the functionality of computer system 700 is implemented in one or more application-specific integrated circuits (ASICs) and/or or one or more digital signal processors (DSPs).

Computer systems (such as computer system 700), as well as electronic devices, computers and servers in system 100 (FIG. 1), may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 112 (FIG. 1) may include: the Internet, World Wide Web (WWW), an intranet, a cellular-telephone network, LAN, WAN, MAN, or a combination of networks, or other technology enabling communication between computing systems.

System 100 (FIG. 1) and/or computer system 700 may include fewer components or additional components. Moreover, two or more components may be combined into a single component, and/or a position of one or more components may be changed. In some embodiments, the functionality of system 100 (FIG. 1) and/or computer system 700 may be implemented more in hardware and less in software, or less in hardware and more in software, as is known in the art.

While a social network and a graph database have been used as illustrations in the preceding embodiments, more generally the graph-storage technique may be used store and retrieve or query data associated with a wide variety of applications, services or systems, as well as a wide variety of types of databases. Moreover, the graph-storage technique may be used in applications where the communication or interactions among different entities (such as people, organizations, etc.) can be described by a social graph. Note that the people may be loosely affiliated with a website (such as viewers or users of the website), and thus may include people who are not formally associated (as opposed to the users of a social network who have user accounts). Thus, the connections in the social graph may be defined less stringently than by explicit acceptance of requests by individuals to associate or establish connections with each other, such as people who have previously communicated with each other (or not) using a communication protocol, or people who have previously viewed each other's home pages (or not), etc. In this way, the graph-storage technique may be used to expand the quality of interactions and value-added services among relevant or potentially interested people in a more loosely defined group of people.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure.

Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for querying a graph database, the method comprising:
   receiving the query and a first query header at a first shard of the graph database, from a computer system separate from the graph database, wherein:
      the graph database stores a graph comprising nodes, edges between the nodes, and predicates to represent data;
      the query includes one or more of a subject, a predicate, and an object; and
      the first query header specifies the first shard;
   executing the query at the first shard of the graph database;
   receiving first results and a first result header from the first shard, wherein the first result header specifies that the first results are first partial results; and
   receiving second results and a second result header from a second shard of the graph database, wherein the second result header specifies that the second results are second partial results;
   wherein the second results and the second result header are received from the second shard without a corresponding query being provided to the second shard by the computer system.

2. The method of claim 1, wherein the graph represents the data with index-free adjacency.

3. The method of claim 1, wherein the method further comprises combining the first partial results and the second partial results to obtain a total result.

4. The method of claim 1, wherein the first result header includes information that indicates that the query was subdivided by the first shard and forwarded by the first shard to another shard.

5. The method of claim 1, wherein at least one of the first partial results and the second partial results are received in a set of packets having associated sub-result headers that specify a total number of packets and a position of a given packet in the set of packets.

6. The method of claim 1, further comprising:
   providing the query and a second query header to the second shard;
   wherein the second query header specifies the second shard.

7. The method of claim 1, wherein the method further comprises storing information in a request map that indicates the query was sent to the first shard.

8. The method of claim 1, wherein the subset of the graph includes the desired information expressed within an associated structure of the graph.

9. The method of claim 1, wherein the data is associated with entities in a professional network.

10. The method of claim 1, wherein the method further comprises:
    receiving another query that is compatible with a type of database different from the graph database; and
    converting the other query into the query.

11. The method of claim 10, wherein the type of database includes one of a relational database and a hierarchical database.

12. An apparatus, comprising:
    one or more processors;
    memory; and
    a program module, wherein the program module is stored in the memory and, during operation of the apparatus, is executed by the one or more processors to query a graph database, the program module including:
       instructions for receiving the query and a first query header at a first shard of the graph database, from a computer system separate from the graph database, wherein:
          the graph database stores a graph comprising nodes, edges between the nodes, and predicates to represent data;
          the query includes one or more of a subject, a predicate, and an object; and
          the first query header specifies the first shard;
       instructions for executing the query at the first shard of the graph database;
       instructions for receiving first results and a first result header from the first shard, wherein the first result header specifies that the first results are first partial results; and
       instructions for receiving second results and a second result header from a second shard of the graph database, wherein the second result header specifies that the second results are second partial results;
       wherein the second results and the second result header are received from the second shard without a corresponding query being provided to the second shard by the computer system.

13. The apparatus of claim 12, wherein the graph represents the data with index-free adjacency.

14. The apparatus of claim 12, wherein the program module comprises:
    instructions for combining the first partial results and the second partial results to obtain a total result; and
    instructions for providing at least a portion of the total result to an application associated with the query.

15. The apparatus of claim 12, wherein at least one of the first partial results and the second partial results are received in a set of packets having associated sub-result headers that specify a total number of packets and a position of a given packet in the set of packets.

16. The apparatus of claim 12, wherein:
    the program module further comprises instructions for providing the query and a second query header to the second shard; and
    the second query header specifies the second shard.

17. The apparatus of claim 12, wherein the program module further comprises instructions for storing information in a request map that indicates the query was sent to the shard.

18. The apparatus of claim 12, wherein the first result header includes information that indicates that the query was subdivided by the first shard and forwarded by the first shard to another shard.

19. The apparatus of claim 12, wherein the program module further comprises:
    instructions for receiving another query that is compatible with a type of database different from the graph database; and
    instructions for converting the other query into the query.

20. A system, comprising:
    a processing module comprising a non-transitory computer readable medium storing instructions that, when executed, cause the system to:

receive the query and a first query header at a first shard of the graph database, from a computer system separate from the graph database, wherein:
  the graph database stores a graph comprising nodes, edges between the nodes, and predicates to represent data;
  the query includes one or more of a subject, a predicate, and an object; and
  the first query header specifies the first shard;
execute the query at the first shard of the graph database;
receive first results and a first result header from the first shard, wherein the first result header specifies that the first results are first partial results; and
receive second results and a second result header from a second shard of the graph database, wherein the second result header specifies that the second results are second partial results;
wherein the second results and the second result header are received from the second shard without a corresponding query being provided to the second shard by the computer system.

\* \* \* \* \*